2 Sheets—Sheet 1.

N. B. JONES.
TOBACCO-PRESS.

No. 186,577. Patented Jan. 23, 1877.

2 Sheets—Sheet 2.

N. B. JONES.
TOBACCO-PRESS.

No. 186,577.　　　　　　　　　Patented Jan. 23, 1877.

WITNESSES:
Jas. E. Hutchinson
H. C. Hazard

INVENTOR:
N. B. Jones, by
Prindle and Loomis his Attys

UNITED STATES PATENT OFFICE.

NEEDHAM B. JONES, OF GUTHRIE, KENTUCKY.

IMPROVEMENT IN TOBACCO-PRESSES.

Specification forming part of Letters Patent No. 186,577, dated January 23, 1877; application filed November 20, 1876.

*To all whom it may concern:*

Be it known that I, N. B. JONES, of Guthrie, in the county of Todd and in the State of Kentucky, have invented certain new and useful Improvements in Tobacco-Presses; and do hereby declare that the following is a full, clear, and exact description thereof, reference being had to the accompanying drawings, making a part of this specification, in which—

Figure 1:
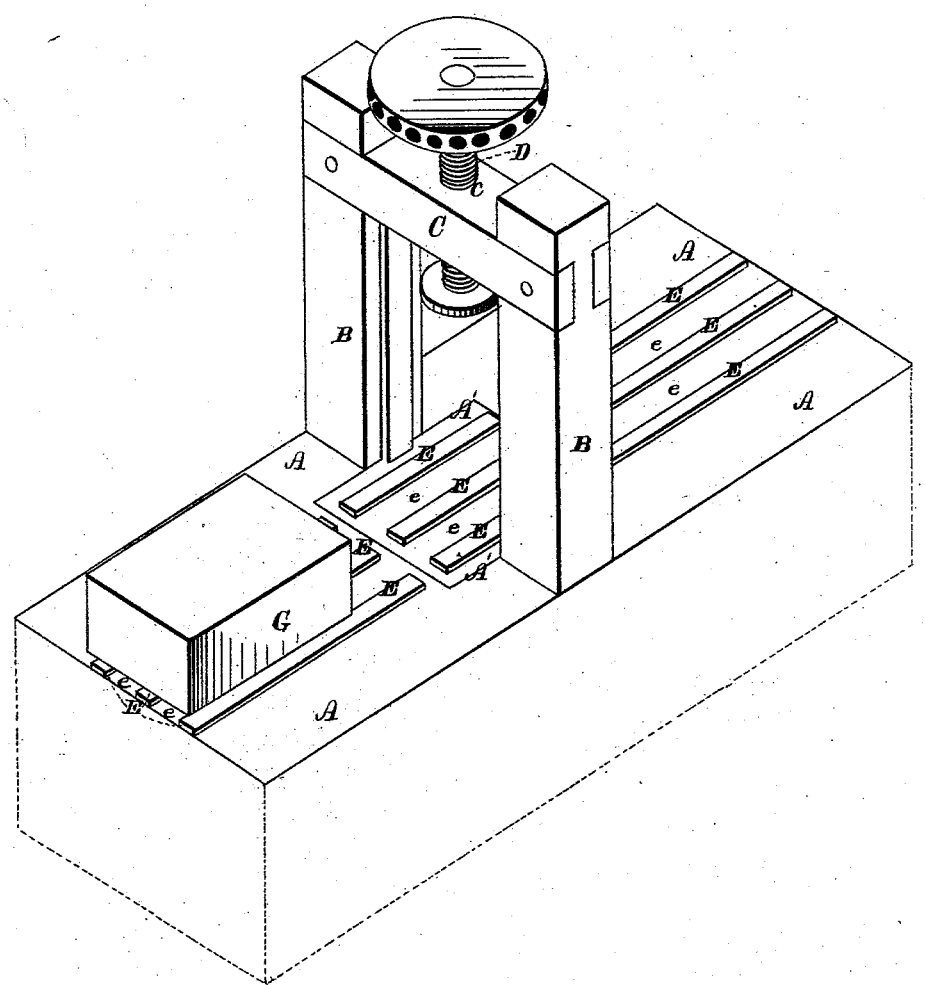
Figure 2:
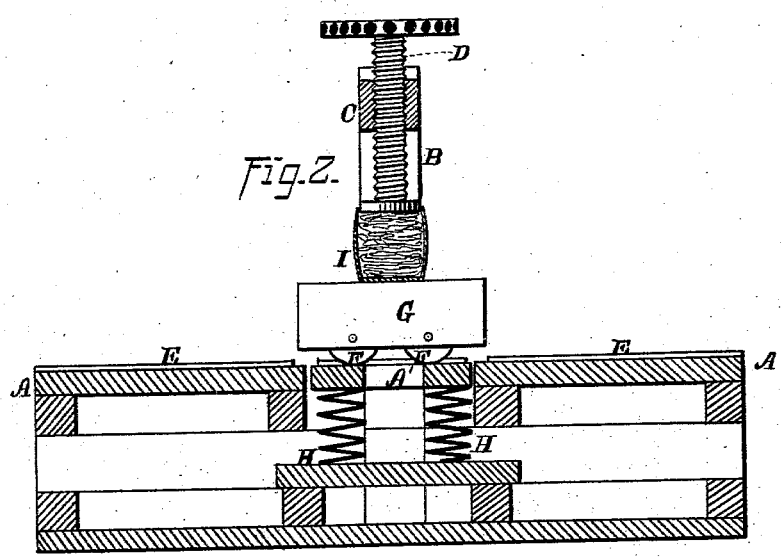
Figure 3:
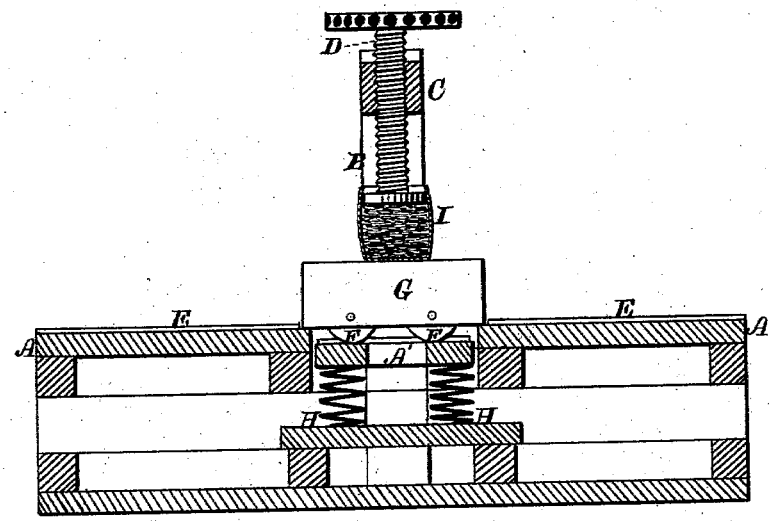

Figure 1 is a perspective view of my improved press and truck, the latter being loaded and ready to be run beneath the former. Fig. 2 is a longitudinal section of said press, the truck being in position beneath the screw; and Fig. 3 is a like view of the same, pressure being applied to the tobacco, and said truck resting upon the platform.

Letters of like name and kind refer to like parts in each of the figures.

The design of my invention is to facilitate the pressing of tobacco within casks; and it consists in combining, with a screw-press, and with a wheeled truck, for use beneath the same, a vertically-movable platform, which is capable of dropping until the ends of said truck rest upon stationary supports and its wheels are relieved from increase of pressure, substantially as and for the purpose hereinafter specified.

In the annexed drawings, A represents a platform, provided at or near its center with two vertical standards, B, which extend upward to a suitable height, and are united at their upper ends by means of a cross-bar, C, that, at its longitudinal center, is provided with a threaded opening, c, which receives a screw, D, the whole constituting a screw-press for operating upon tobacco.

Extending lengthwise of the platform A, between the standards B, are three rails, E, between which are formed two grooves or channels, e, that receive and contain the wheels F of a truck, G, and furnish guides for the same, so as to permit said truck to be moved freely lengthwise of said platform without change of its lateral position.

Between the standards B a portion, A', of the platform A is separated from the latter, and is capable of being depressed a distance equal to the elevation of the lower side of the truck G above said platform.

A number of springs, H, are placed beneath the platform A', for the purpose of holding the same in position with its upper surface flush with the upper surface of the platform A, and said springs have such strength as to enable them to sustain, in addition to the weight named, the weight of the car G, and of a cask of tobacco, I, placed thereon.

The length of the movable platform A' is but slightly greater than the distance between the outer edges of the wheels F, so that, if sufficient pressure is applied to the upper side of the truck to cause the springs H to yield, and said platform to be depressed, the ends of said truck will rest upon the stationary platform A, and thereafter will sustain the whole pressure.

The device described is employed as follows: The truck is moved from beneath the press, a cask is then placed upon the former and filled, after which said truck is run beneath said press, and the pressure of the screw applied to the upper surface of said tobacco.

The pressure of the screw will cause the movable platform, with its load, to settle until the truck rests upon the stationary platform, after which the truck-wheels and their journals are relieved from further pressure, and any desired increase of the latter may be had without strain or injury to said parts.

After the tobacco has become set the screw is moved upward, the movable platform rises to place, and the truck is moved from beneath the press to be unloaded and again loaded.

In practice, it is found advantageous to employ two trucks, and unload and reload one while the tobacco upon the other is setting.

If desired, the springs beneath the movable platform may be omitted, and levers or other equivalent means employed for lowering and raising the same.

Having thus fully set forth the nature and merits of my invention, what I claim as new is—

In combination with a screw-press, and with a wheeled truck, for use beneath the same, a vertically-movable platform, which is capable of dropping until the ends of said truck rest upon stationary supports and its wheels are relieved from increase of pressure, substantially as and for the purpose specified.

In testimony that I claim the foregoing I have hereunto set my hand and seal this 17th day of November, 1876.

NEEDHAM BRYAN JONES. [L. S.]

Witnesses:
 J. GREER,
 I. H. ROSS.